United States Patent [19]

Montgomery et al.

[11] Patent Number: 5,604,164
[45] Date of Patent: Feb. 18, 1997

[54] REFRACTORY BOAT AND METHOD OF MANUFACTURE

[75] Inventors: Lionel C. Montgomery, Westlake; Ajoy Zutshi, Avon Lake, both of Ohio

[73] Assignee: Advanced Ceramics Corporation, Lakewood, Ohio

[21] Appl. No.: 524,242

[22] Filed: Sep. 6, 1995

[51] Int. Cl.$^6$ .................................................. C04B 35/583
[52] U.S. Cl. .................... 501/96; 501/98; 75/235; 75/244
[58] Field of Search ................ 501/96, 98; 75/235, 75/244

[56] References Cited

U.S. PATENT DOCUMENTS

| | | | |
|---|---|---|---|
| 3,003,885 | 10/1961 | Mandorf, Jr. | 252/500 |
| 3,181,968 | 5/1965 | Mandorf, Jr. | 427/566 |
| 3,202,862 | 8/1965 | Paley | 313/357 |
| 3,236,663 | 2/1966 | Grulke et al. | 501/98 |
| 3,251,700 | 5/1966 | Mandorf, Jr. | 501/96 |
| 3,256,103 | 6/1966 | Roche, Jr. et al. | 501/98 |
| 3,408,312 | 10/1968 | Richards et al. | 252/518 |
| 3,433,656 | 3/1969 | Allen et al. | 501/96 |
| 3,544,486 | 12/1970 | Passmore et al. | 427/250 |
| 3,582,611 | 6/1971 | Matheson et al. | 392/389 |
| 3,649,314 | 3/1972 | James | 501/96 |
| 3,813,252 | 5/1974 | Lipp | 252/520 |
| 3,915,900 | 10/1975 | Reinmuth et al. | 252/520 |
| 3,928,244 | 12/1975 | Passmore | 501/96 |
| 4,008,183 | 2/1977 | Ishii et al. | 75/231 |
| 4,029,000 | 6/1977 | Nakamura et al. | 92/170.1 |
| 4,199,480 | 4/1980 | Parent et al. | 501/96 |
| 4,268,314 | 5/1981 | Montgomery | 501/98 |
| 4,373,952 | 2/1983 | Parent | 75/244 |
| 4,526,840 | 7/1985 | Jerabek | 501/96 |
| 5,100,845 | 3/1992 | Montgomery | 501/96 |
| 5,308,044 | 5/1994 | Nakashima et al. | 501/96 |

*Primary Examiner*—Mark L. Bell
*Assistant Examiner*—Louis M. Troilo
*Attorney, Agent, or Firm*—Eugene Lieberstein; Michael N. Meller

[57] ABSTRACT

A refractory boat formed from an intermetallic composite comprising titanium diboride and boron nitride or titanium diboride, boron nitride and aluminum nitride and further including a metal selected from molybdenum, tungsten, tantalum and niobium and an oxide of CaO or $Y_2O_3$ with the minimum concentration of oxide of from 0.7 wt % and with a maximum combined concentration of metal and oxide not exceeding 20 wt %. The invention is also directed to a method for forming a hot pressed refractory boat of an intermetallic composite composition as indicated above which is hot pressed at about 1900° C.

11 Claims, No Drawings

REFRACTORY BOAT AND METHOD OF MANUFACTURE

TECHNICAL FIELD

This invention relates to a refractory boat formed from an intermetallic composite comprising titanium diboride and boron nitride and to a method for manufacturing a high-strength refractory boat.

BACKGROUND OF INVENTION

Vacuum deposition is a common method for coating metals such as aluminum, copper, zinc, and tin onto various substrates of metal, glass, and plastic. The metal is typically vaporized by means of electric resistance heating in a metallic or ceramic vessel generally referred to in the art as a "boat." The boat is connected to a source of electrical power within an evacuated chamber and heated to a controlled operating temperature sufficient to cause a metal charge placed in contact with the boat to vaporize. The metallizing temperature, that is, evaporation temperature controls the rate of evaporation of the metal charge which, in turn, determines product production.

There is a current need in the industry to increase the useful life of the boat so as to increase product production and reduce the overall cost of the deposition process without necessarily increasing the rate of metal evaporation from current rates of metal evaporation. Evaporation rates for aluminum of about 1.8 to 2.5 gms/min./in$^2$ or lower are now conventional and are achieved at evaporation temperatures at or below 1500° C. At this evaporation rate, an intermetallic composite—composed of either a binary intermetallic composition of titanium diboride and boron nitride or a ternary composition of titanium diboride, boron nitride, and aluminum nitride—has been effectively used to produce a high-density, relatively strong boat. If the evaporation temperature exceeds 1500° C., the rate of reaction of the aluminum metal with the boat increases to adversely reduce the useful life of the boat. A causal relationship exists between the rate of reaction of aluminum and the boat which affects the useful life of the boat and is primarily attributable to the composition of the boat and its density. The useful life of the boat is also affected by the degree of wetting of the boat upon vaporization of the aluminum metal charge. Heretofore it has not been possible to increase the useful life of the boat without substantially degrading boat performance.

SUMMARY OF THE INVENTION

It was discovered, in accordance with the present invention, that the useful life of a refractory boat can be substantially extended at current evaporation rates and temperatures as well as at elevated evaporation rates without loss in density and without suffering physical deformation by manufacturing the boat from a ceramic composite composition of titanium diboride and boron nitride in combination with an oxide of calcium or yttrium and a metal selected from the group consisting of Mo, W, Nb, and Ta, with each component added in a preferred minimum concentration. Molybdenum is the preferred metal and $Y_2O_3$ is the preferred additive. The addition of an elemental metal such as molybdenum and an oxide additive such as $Y_2O_3$ has been found to substantially improve the properties of the boat, especially its wetting characteristics, and a reduction in the rate of corrosion of the boat cavity by aluminum. This substantially increases the useful life of the boat even at current rates of evaporation. Moreover, a refractory boat formed of a binary composite composition of titanium diboride and boron nitride in combination with molybdenum and $Y_2O_3$ has been shown in accordance with the present invention to continuously vaporize aluminum at evaporation rates of up to 3.5 g/min/in$^2$ without degrading boat performance.

The refractory boat of the present invention is suitable for evaporating metals such as aluminum—either at conventional evaporation rates and temperatures of about 1500° C. or at elevated rates and temperatures and may be formed from either a binary intermetallic composite of titanium diboride and boron nitride or a ternary composition of titanium diboride, boron nitride, and aluminum nitride. In either case when Mo is added to the composite in combination with an oxide of calcium or yttrium the result is substantially improved wetting of the boat cavity by aluminum, better vaporation performance under continuous conditions and a longer life boat. For purposes of the present invention it is believed that a metal selected from the group consisting of W, Ta and Nb may be substituted for Mo.

A refractory boat composed of an intermetallic composite of titanium diboride and boron nitride, with the addition only of molybdenum will not significantly increase wettability or improve performance compared to the performance of a refractory boat fabricated from a conventional i.e. standard intermetallic composite composition of titanium diboride and boron nitride. However, when the boat is fabricated from an intermetallic composite of titanium diboride and boron nitride containing the addition of elemental molybdenum and an oxide of calcium or yttrium at above preselected minimum levels, the useful life of the boat is substantially increased relative to the useful life of the standard boat composition. The minimum concentration for the oxide of calcium and/or yttrium is from about 0.7 wt. %, with a maximum concentration for the combined combination of molybdenum and an oxide of calcium and/or yttrium of 20 wt. %. It is hypothesized that niobium, tungsten, and tantalum may be substituted for molybdenum, although the optimum concentration will vary.

The prefered embodiment of the present invention is directed to a binary intermetallic composition for forming a refractory boat which consists essentially of titanium diboride, boron nitride, a metal selected from the group consisting of molybdenum, tungsten, tantalum, and niobium in a minimum concentration of 3 wt. %, and an oxide selected from the group consisting of CaO and $Y_2O_3$ in a minimum concentration of from 0.7 wt. %, with the maximum combined concentration of metal and oxide not exceeding 20 wt. %

The present invention also comprises a method for forming a hot-pressed refractory boat having a density above 93% of theoretical, comprising the steps of (1) forming a ceramic composite of titanium diboride, boron nitride, a metal selected from the group consisting of molybdenum, tungsten, tantalum, and niobium, and an oxide selected from the group consisting of CaO and $Y_2O_3$, and (2) hot pressing the composition at a temperature about 1900° C.

DETAILED DESCRIPTION OF THE INVENTION

Ceramic refractory boats are typically manufactured from either a binary intermetallic composite composition of titanium diboride and boron nitride or a ternary composition of titanium diboride, boron nitride, and aluminum nitride. The conventional binary composition of titanium diboride and boron nitride has a higher vapor pressure than the ternary composition of titanium diboride, boron nitride, and aluminum nitride. Accordingly, a refractory boat composed from a conventional binary composition should theoretically permit evaporation at elevated evaporation temperatures, which would increase the rate of production. However, production grade binary intermetallic composites of titanium diboride and boron nitride do not wet-in well when used to vaporize aluminum, which inhibits its performance and useful life at elevated evaporating rates.

It has been discovered, in accordance with the present invention, that the useful life of a refractory boat for vaporizing aluminum can be substantially extended by fabricating the boat from either a binary ceramic composition of titanium diboride and boron nitride or a ternary composition of titanium diboride, boron nitride, and aluminum nitride, with the addition of a metal selected from the group consisting of molybdenum, tungsten, tantalum, and niobium, and an oxide selected from the group consisting of CaO and $Y_2O_3$. The oxide should be present in a minimum concentration of from 0.7 wt. %, and the combined concentration of metal and oxide should not exceed 20 wt. %. The minimum concentration of added metal should preferably be 3 wt. % It has been further discovered that hot pressing a binary ceramic composition of titanium diboride, boron nitride, molybdenum, and an oxide selected from the group consisting of CaO and $Y_2O_3$ at a temperature above about 1900° C. will produce a refractory body capable of aluminum metal evaporation at elevated evaporation rates and temperatures. A cavity formed in such a refractory body wears uniformly, even at high evaporating temperatures, and will be wet by aluminum immediately and throughout the entire cavity, for the life of the boat.

The following Table 1 is a comparison of refractory boats composed from a binary ceramic composition of titanium diboride and boron nitride, containing selected combinations of Mo, CaO, and $Y_2O_3$ which were tested for purposes of comparative evaluation to vaporize aluminum continuously at a high evaporation rate of 3.5 g/minute/square inch of boat cavity.

TABLE 1

| | BOAT GRADES | | | | |
|---|---|---|---|---|---|
| | 5027 | 5027-B | Mo-26 | Mo-21 | Mo-21A |
| Composition, Weight % | | | | | |
| $TiB_2$ | 45.05 | 45.69 | 45.5 | 45.0 | 44.58 |
| BN | 53.95 | 52.51 | 45.5 | 45.0 | 44.59 |
| CaO | 1.0 | — | — | 1.0 | — |
| $Y_2O_3$ | — | 1.8 | — | — | 1.83 |
| Mo | — | — | 9.0 | 9.0 | 9.0 |
| Density Percent Theoretical | 95.0 | 84.5 | 96.2 | 97.3 | 94.5 |
| Metallizing Wet in Temp °C. | ½ cavity wet, 1490 | 1500 | ¾ cavity wet, 1475 | All cavity wet, 1460 | All cavity wet, 1440 |
| | Metallizing at 3.5 g/minute/square inches | | | | |
| Electrical Stability | Satisfactory | | Satisfactory | Very Stable | Very Stable |
| Boat Bowing | No | | Some | No | No |
| Aluminum Spitting | After 12 Hrs | (Due to | After 8 Hrs | After 18 Hrs | After 18 Hrs |
| Slag Wet | No | Low | Wets; dewets | Yes | Yes |
| Amount of Wear | Heavy | Density | Heavy | Moderate | Moderate |
| Wear Pattern | Thin, Short | Not Tested | Thin, Short | Wide, Long | Wide, Long |
| Boat Life, Hours | 12 | As a Boat) | 8 | 18 | 18 |
| Overall Performance | Satisfactory | | Marginal | Very Good | Excellent |

The concentration of molybdenum in Table 1 is 9 wt. %, which is within an overall preferred range for molybdenum of between 3% to 11%. It should be noted that grade 5027 is used herein as the reference grade since a refractory boat with this composition is commercially available from the assignee, Advanced Ceramics Corporation of Cleveland, Ohio, USA. Grade 5027-B does not contain molybdenum, but does contain $Y_2O_3$. This boat was not evaluated because of its low density. The density of the boat should be at least 90% of theoretical for satisfactory performance, with a density of over 93% preferred. Grade Mo-26 contains molybdenum, but does not contain an oxide of either calcium or yttrium. The performance of the boat composed of grade Mo-26 was marginal and its useful life was 50% lower than the useful life of the standard grade 5027. In contradistinction, grade Mo-21 and grade Mo-21A, which contain both molybdenum and an oxide of either calcium or yttrium performed very well and exhibited 100% wetting of the boat cavity in which the aluminum metal is placed. The useful life of the boat with both molybdenum and an oxide of either calcium or yttrium was 50% greater than that of the standard grade 5027. The performance with yttria was noticeably better than the performance with calcium oxide and is, as such, preferred.

The material properties of the different grade compositions of Table 1 are shown in Table 2. It is significant to note in Table 2 that the flexure strength of the compositions containing both Mo+CaO or Mo+$Y_2O_3$, inclusive of grade Mo-21 and grade Mo-21A, show signficantly higher strengths at 1500° C. than standard grade 5027. The density remained high in each case except for grade 5027-B, which contained only yttria as an additive. Thus, the unexpected benefits of the present invention are realized only when molybdenum or an equivalent metal—which is believed to include tantalum, niobium, and tungsten—is added to the intermetallic composition in addition to yttria or its less desirable equivalent calcium oxide and in the proportions set forth in this application.

TABLE 2

GRADES

| Properties | Standard Production 5027 | 5027-B | Mo-26 | Mo-21 | Mo-21A |
|---|---|---|---|---|---|
| Additives | CaO | Y$_2$O$_3$ | Mo | Mo + CaO | Y$_2$O$_3$ + Mo |
| Density % Theoretical | 95.2 | 84.5 | 96.2 | 97.3 | 94.5 |
| Flexure Strength psi | | | | | |
| 25° C. | 17400 | 9194 | | 17770 | 10000 |
| 1500° C. | 2370 | 3192 | | 6288 | 6280 |
| Sonic Modulus psi × 10$^6$, 25° C. | 17.7 | 13.2 | | 18.4 | 11.8 |
| Electrical Resistivity μΩcm, 25° C. | 817 | 1210 | | 583 | 747 |
| CTE in/in/°C. × 10$^{-6}$ | 5.0 | 6.8 | | 7.5 | 7.1 |
| Permanent Expansion % R.T. to 1500° C. to R.T. | 0.9 | 0.5 | | 0.4 | 0.2 |

Table 3, as is shown below, is significant in that it shows a substantial drop in the aluminum wet-in temperature for each of the composites containing both Mo and yttria, except composition grade Mo-21J due to the fact that the yttria content was only 0.54 wt. %. The flexural strength at 1500° C. for each of the composites containing both Mo and yttria was higher than the standard production grade 5027.

TABLE 3

COMPOSITION, PROPERTIES, AND ALUMINUM WET-IN
TEMPERATURES OF TiB$_2$ + BN COMPOSITES
CONTAINING VARYING AMOUNTS OF Mo AND Y$_2$O$_3$

| | GRADE | | | | | | |
|---|---|---|---|---|---|---|---|
| | 5027 | Mo-21J | Mo-21A | Mo-21K | Mo-21H | Mo-21P | Mo-21R |
| Composition, Weight % | | | | | | | |
| TiB$_2$ AC-6038 | 44.55 | 44.585 | 44.585 | 44.585 | 44.585 | 44.585 | 44.585 |
| BN | 54.45 | 44.585 | 44.585 | 44.585 | 44.585 | 44.585 | 44.585 |
| Mo | — | 10.29 | 9.0 | 8.34 | 6.50 | 5.42 | 4.33 |
| Y$_2$O$_3$ | — | 0.54 | 1.83 | 2.49 | 4.33 | 5.41 | 6.50 |
| CaO | 1.00 | — | — | — | — | — | — |
| Properties | | | | | | | |
| Density % Theoretical | 95.2 | 96.9 | 94.5 | 94.9 | 95.4 | 96.0 | 94.7 |
| Flexible Strength psi | | | | | | | |
| 25° C. | 17400 | 9736 | 10000 | 9119 | 7800 | 9200 | 10332 |
| 1500° C. | 2370 | 5445 | 6280 | 5610 | 4807 | 7063 | 6990 |
| Sonic Modulus psi × 10$^6$, 25° C. | 17.7 | 13.9 | 11.8 | 11.6 | 9.1 | 9.5 | 8.1 |
| Electrical Resistivity μΩcm, 25° C. | 817 | 972 | 747 | 676 | 1100 | 462 | 420 |
| CTE in/in/°C. × 10$^{-6}$ to 1500° C. | 5.0 | 7.84 | 7.1 | 7.61 | 7.87 | 7.72 | 7.9 |
| Permanent Expansion % R.T. to 1500° C. to R.T. | 0.9 | 0.28 | 0.20 | 0.16 | 0.19 | 0.11 | 0.08 |
| Aluminum Wet-in Temperature, °C. | 1500 | 1500 | 1460 | 1410 | 1390 | 1390 | |

In Table 4, as shown below, a conventional evaporation rate of 2.5 g/min/in$^2$ of boat cavity was used for comparison of the properties of the different grade composite materials relative to the performance of the standard grade 5027. The wettability of the composites containing both Mo and yttria was superior to the standard production grade 5027.

TABLE 4

| | BOAT GRADES | | | | | |
|---|---|---|---|---|---|---|
| | PROD. 5027 | Mo-21J | Mo-21A | Mo-21K | Mo-21H | Mo-21P |
| Composition, Weight % | | | | | | |
| $TiB_2$ | 44.55 | 44.585 | 44.585 | 44.585 | 44.585 | 44.585 |
| BN | 54.45 | 44.585 | 44.585 | 44.585 | 44.585 | 44.585 |
| Mo | — | 10.29 | 9.0 | 8.34 | 6.50 | 5.42 |
| $Y_2O_3$ | — | 0.54 | 1.83 | 2.49 | 4.33 | 5.41 |
| CaO | 1.0 | — | — | — | — | — |
| | CONTINUOUS METALLIZING AT 2.5 G/MIN/$IN^2$ OF BOAT CAVITY | | | | | |
| Corrected Aluminum Wet-In, °C. | 1490 | 1500 | 1400 | 1410 | 1390 | 1390 |
| Degree of Aluminum Coverage in Cavity | Incomplete −50% Covered | Sluggish but Covered, 100% | Complete 100% Covered | Complete 100% Covered | Complete 100% Covered | Complete 100% Covered |
| Slag - Degree of Wetting | Slag Not Wet | Slag Not Wet | Slag Wet | Slag Wet | Slag Wet | Slag Wet |
| Aluminum Spitting | None | None | None | None | During 19th Hour | None |
| Electrical Stability | Variable | Variable | Very Stable | Very Stable | Up to End of 18th Hour Very Stable | Very Stable |
| Overall Performance | Good | Started Dewetting as Metallizing Time Increased Poor Performance | Very Good | Very Good | Very Good up to Start of Aluminum Spitting | Excellent |
| Wear Pattern | Thin Groove | | | Deep, Long Groove | Long Groove | Narrow, Long Groove | Wide, Shallow, and Long |
| Amount of Wear | Average | Average | Much | Average | Heavy | Moderate |
| Maximum Life*, Number of One-Hour Cycles | 24 | 8 | 28 | 10 | 19 | 34 |

*No aluminum spitting; boat cooled after each one-hour cycle of metallizing; one boat per grade evaluated.

Table 5 substantiates the ability to scale up using molybdenum and calcium oxide to achieve the increased performance discussed heretofore. The substantial increase in flexural strength at 1500° C. should be noted.

TABLE 5

COMPARISON OF PRODUCTION BILLETS CONTAINING MOLYBDENUM AND CaO TO THE PROPERTIES OF PRODUCTION IMC GRADE 5027

| | Grade | |
|---|---|---|
| | 5027 Billet 62192 | Mo-21-1 Billet 64882 |
| Composition, Weight % | | |
| $TiB_2$ AC-6038 | 40.05 | 42.03 |
| BN | 48.95 | 47.97 |
| CaO | 1.0 | 1.0 |
| Mo | — | 9.0 |
| Remix | 10.0 | — |
| Properties | | |
| Density, % Theoretical | 95.2 | 97.2 |
| Flexural Strength, psi | | |
| 25° C. | 17,400 | 16,970 |
| 1500° C. | 2,370 | 6,912 |
| Sonic Modulus, psi × $10^6$ to 25° C. | 17.7 | 17.9 |
| Electrical Resistivity, μΩcm, | | |
| 25° C. | 817 | 726 |
| 1500° C. | 4,100 | 1,833 |
| CTE in/in/°C. × $10^{-6}$ to 1500° C. | 5.0 | 7.5 |
| Permanent Expansion, | 0.9 | 0.47 |

TABLE 5-continued

COMPARISON OF PRODUCTION BILLETS CONTAINING MOLYBDENUM AND CaO TO THE PROPERTIES OF PRODUCTION IMC GRADE 5027

| | Grade | |
|---|---|---|
| | 5027 Billet 62192 | Mo-21-1 Billet 64882 |
| 25° C.–1500° C.–25° C. | | |

Table 6 substantiates the increase in useful life of a boat composed of an intermetallic composite of titanium diboride and boron nitride containing molybdenum and either yttria or calcium oxide relative to production grade 5027 composite. The useful life increased at least 50% under actual field operating conditions at a commercial metallizing shop to vaporize aluminum continuously at 3.59 g/min/$in^2$ of boat cavity.

TABLE 6

| | Production Grade 5027 | (Mo + CaO) Mo-21 | (Mo + $Y_2O_3$) Mo-21A |
|---|---|---|---|
| Boat Size, Inches | 8 × 1 × 0.5 | 8 × 1 × 0.5 | 8 × 1 × 0.5 |
| Boat Cavity Area, $in^2$ | 3.41 | 3.41 | 3.41 |
| Aluminum Wire, Φ | 0.093 | 0.093 | 0.093 |
| Gm/min/$in^2$ of Cavity | 3.59 | 3.59 | 3.59 |
| Gms/min Metallizing | 12.24 | 12.24 | 12.24 |
| Aluminum Wetting | 1490° C. | 1460° C. | 1440° C. |

TABLE 6-continued

|  | Production Grade 5027 | (Mo + CaO) Mo-21 | (Mo + Y$_2$O$_3$) Mo-21A |
|---|---|---|---|
| Temperature Electrical Stability | Satisfactory | Very Stable | Very Stable |
| Boat Bowing | No | No | No |
| Time to Coat One Roll, min | 30 | 30 | 30 |
| Boat Life | | | |
| a. Rolls Coated | 23 | 35 | 35 |
| b. Hours | 11.5 | 17.5 | 17.5 |
| Pounds of Aluminum Vaporized | 18.6 | 28.3 | 28.3 |
| Percent Boat Life Improvement When Compared to Production Grade 5027 | — | 52.17 | 52.17 |

Table 7, as indicated below, substantiates that the improved properties of the present invention is realized for an intermetallic ternary composition of titanium diboride, boron nitride, and aluminum nitride, showing a very low wet-in temperature and 100% wetting of the boat cavity, with an excellent overall performance at an aluminum metallizing rate of 2.5 g/min/in$^2$ of boat cavity.

TABLE 7

| COMPOSITION | WEIGHT PERCENT |
|---|---|
| TiB$_2$ | 36.448 |
| BN | 42.117 |
| CaO | 0.860 |
| AlN | 10.105 |
| Mo | 5.231 |
| Y$_2$O$_3$ | 5.239 |
| Density Hot Pressed | 94% (Production Size Stock) |
| Wet-in Temperature °C. (corrected): | 1305 |
| Degree of Wetting: | 100% cavity covered; slag wet |
| Aluminum Spitting: | None |
| Electrical Stability: | Very Stable |
| Overall Performance: | Excellent |
| Wear | Moderate (for 10 cycles, each cycle one hour) |

The intermetallic composites of titanium diboride and boron nitride or titanium diboride, boron nitride, and aluminum nitride were all selected in an appropriate weight percent range relative to one another, as is well known to those skilled in the art, to establish a desired resistivity and strength based on its bond phase relationship at a given operating temperature. Accordingly, the percentages of these components may be adjusted relative to one another to vary its resistivity and bond phase, as is well known to those skilled in the art, without affecting the teaching of the present invention.

What is claimed is:

1. A refractory boat suitable for evaporating metals such as aluminum consisting essentially of an intermetallic composition of either titanium diboride and boron nitride or titanium diboride, boron nitride and aluminum nitride formed by the process of hot pressing said composition with a metal selected from the group consisting of Mo, Ta, W, and Nb, and an oxide selected from the group consisting of CaO and Y$_2$O$_3$ in a minimum oxide concentration of from 0.7 wt. %, and with the maximum combined concentration of metal and oxide in the intermetallic composition not exceeding 20 wt. %.

2. An intermetallic composition for forming a refractory boat essentially of titanium diboride and boron nitride, or titanium diboride, boron nitride and aluminum nitride and further including a metal selected from the group consisting of molybdenum, tungsten, tantalum, and niobium, and an oxide selected from the group consisting of CaO and Y$_2$O$_3$, with the oxide present in a minimum concentration of from 0.7 wt. %, and with the maximum combined concentration of metal and oxide in the intermetallic composition not exceeding 20 wt. %.

3. An intermetallic composition as defined in claim 2 wherein when said metal is selected from the group consisting of molybdenum, tungsten and tantalum it has a concentration in said composition of between 3–11 wt %.

4. An intermetallic composition as defined in claim 3 wherein said metal concentration in said composition is between 3–6 wt % for refractory boat operation at evaporation rates not exceeding about 2.5 gms/min./in$^2$.

5. An intermetallic composition as defined in claim 4 wherein said concentration of yttrium in said composition is between 4–6 wt %.

6. An intermetallic composition as defined in claim 3 wherein said metal concentration in said composition is between 7–10 wt % for refractory boat operation at evaporation rates of above 2.5 gms/min./in$^2$ to a rate of 3.5 gms/min./in$^2$ or higher.

7. An intermetallic composition as defined in claim 6 wherein said concentration of yttrium in said composition is between 1–2.5 wt %.

8. An intermetallic composition as defined in claim 3 wherein when said composition includes aluminum nitride and said oxide is Y$_2$O$_3$ the metal concentration is substantially equal to the concentration of said oxide.

9. A method for forming a hot-pressed refractory boat having a density above 93% of theoretical, comprising the steps of (1) forming a ceramic composition consisting essentially of either titanium diboride and boron nitride or titanium diboride, boron nitride and aluminum nitride, adding to said composition one or more metals selected from the group consisting of Mo, Ta, W, and Nb in a minimum concentration of about 3 wt. %, and an oxide of calcium and/or yttrium with the maximum combined concentration of metal and oxide in the intermetallic composition not exceeding 20 wt. %, and (2) hot pressing the composition at a temperature of about 1900° C.

10. A refractory boat suitable for evaporating metals such as aluminum having a density above 93% of theoretical consisting essentially of an intermetallic composite of titanium diboride and boron nitride or titanium diboride, boron nitride and aluminum nitride, and including one or more metals selected from the group consisting of Mo, Ta, W, and Nb in a minimum concentration of 3% by weight, and a reactant product including calcium and/or yttrium in a concentration of at least 0.3% by weight.

11. A refractory boat as defined in claim 10 wherein said reactant product contains yttrium in a concentration of at least 0.3% by weight.

* * * * *